United States Patent
Dufrene

(10) Patent No.: US 10,732,999 B2
(45) Date of Patent: Aug. 4, 2020

(54) METHOD FOR PROVIDING GRAPHICAL CONTROL

(71) Applicant: Schneider Electric Industries SAS, Rueil-Malmaison (FR)

(72) Inventor: Pierre Dufrene, Nice (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 187 days.

(21) Appl. No.: 15/433,806

(22) Filed: Feb. 15, 2017

(65) Prior Publication Data

US 2017/0242723 A1   Aug. 24, 2017

(30) Foreign Application Priority Data

Feb. 18, 2016 (EP) .................................... 16305183

(51) Int. Cl.
*G06F 9/451* (2018.01)
*G06F 3/14* (2006.01)
*G06F 9/455* (2018.01)

(52) U.S. Cl.
CPC .............. *G06F 9/452* (2018.02); *G06F 3/14* (2013.01); *G06F 9/45558* (2013.01); *G06F 9/45533* (2013.01); *G09G 2370/04* (2013.01)

(58) Field of Classification Search
CPC .. G06F 9/45558; G06F 9/452; G06F 9/45533; G06F 3/14; G06F 3/1446; G09G 2370/04
See application file for complete search history.

(56) References Cited

U.S. PATENT DOCUMENTS

| | | | |
|---|---|---|---|
| 8,117,554 B1* | 2/2012 | Grechishkin | G06F 9/45558 715/764 |
| 2011/0276661 A1 | 11/2011 | Gujarathi et al. | |
| 2013/0246932 A1* | 9/2013 | Zaveri | G06F 3/017 715/740 |
| 2016/0371104 A1* | 12/2016 | Zamir | G06F 9/45533 |

OTHER PUBLICATIONS

European Search Report dated Jun. 8, 2016 in European application 16305183.2, filed Feb. 16, 2016 (with Written Opinion).

* cited by examiner

*Primary Examiner* — Jacob D Dascomb
(74) *Attorney, Agent, or Firm* — Oblon, McClelland, Maier & Neustadt, L.L.P.

(57) ABSTRACT

A method provides graphical control using virtualization for remote control of industrial automated machines. A guest agent application running on the same virtual machine is introduced as a legacy tool application i.e. source application. Instead of displaying the graphical user interface of the source application in an embedded window, the interface is managed by the guest agent application. The virtual machine, on which both the guest agent application and the tool application run, is in turn managed by a Hypervisor. A new application i.e. a destination application is connected to the guest agent application and the Hypervisor through both of which the interaction of the destination application with the tool is mediated.

12 Claims, 8 Drawing Sheets

METHOD FOR PROVIDING GRAPHICAL CONTROL

The present invention relates to virtualization of applications, and more particular to control of graphical display of applications.

BACKGROUND

In an industrial environment machines may be operated remotely by dedicated tool applications that are configured to interact with the target machine. These tool applications may be run locally on the machine within a certain Operating System or may be run remotely on a server connecting to the machine. To integrate such Tool applications within another application, for example in order to manage multiple machines in one main application, virtualization may be used.

Prior art solutions implement virtualization by running a (legacy) tool application as guest and displaying the graphical user interface in a window that is embedded in the main application which is running on a host, where the main application called for the use of the legacy application. A virtual machine may be created to emulate a hardware environment for an Operating System not compatible with the hardware resources of the host system. A Hypervisor or Virtual Machine Monitor may be implemented as software, firmware or dedicated hardware. This allows to execute multiple instances of the same or different Operating Systems on the same hardware: thereby enabling sharing of resources and/or making resources available which were otherwise not compatible.

When building a new application within a software operating system different from the Operating System of the prior Tool application, the virtualization described above allows incorporation i.e. embedding of the prior tool within its' managed and validated environment. However, in certain applications it is preferred not to incorporate the complete prior tool in the new application. In addition, directly displaying the prior tool in the new application may lead to airspace issues, as the tool window will always be on top of any other window displayed in the new application; esp. in the case of Windows Presentation Foundation (WPF) as graphical platform.

SUMMARY OF INVENTION

The invention introduces a guest agent application running on the same virtual machine as the legacy tool application i.e. source application. Instead of displaying the graphical user interface of the source application in an embedded window, the interface is managed by the guest agent application.

The virtual machine, on which both the guest agent application and the source application run, is in turn managed by a Hypervisor.

A new application i.e. a destination application is connected to the guest agent application and the Hypervisor through both of which the interaction of the destination application with the tool is mediated.

The interaction mediated by the guest agent application includes 1) the managing (such as opening & closing) of graphical objects (such as tree views, editors, sub-windows and dialog boxes), and 2) tracking the position and display area (i.e. size) of the graphical objects.

The interaction mediated by the Hypervisor includes 1) obtaining from the tool the content i.e. image to be displayed within each sub-window and dialog box, and 2) provide to the tool the end user input delivered through mouse and keyboard.

The Hypervisor includes a Virtual Graphic Memory (VGM) for rendering a full bitmap image of the source application representing a Virtual Screen. The VGM will be allocated to the graphical subsystem of the operating system which performs the rendering of the graphical user interface. The graphical subsystem differs depending on the operating software environment of the tool application, e.g. Win32, Windows Presentation Foundation (WPF) or Java. The VGM holds the bitmap as an array of bytes, with the array representing an array of pixels of the bitmap of the virtual screen.

The guest agent application relates it age parts of the rendered Virtual Screen to graphical objects. Thereto, it is configured to interact with the relevant graphical subsystem to identify the graphical object and compute the position and size as it is rendered on the Virtual Screen. For example, for a Win32 source application the guest agent application will go through the window/component hierarchy. For a source application in Windows Presentation Foundation (WPF) the guest agent application goes through the Visual tree; whereas for a source application in Java, it will go through the component tree to compute position and size of a graphical object.

When the Destination application coils for a specific graphical object of the source GUI, the guest agent application provides the computed position and size data of the graphical object. The computed position and size data is included in the interaction of the Destination application with the Hypervisor, which returns the respective image part of the Virtual Screen as a bitmap to the Destination application. The Destination application may display the image part in a window.

When the Destination application calls for another specific graphical object of the source GUI, the guest agent application provides the computed position and size data of this second graphical object. The computed position and size data is again included in the interaction of the Destination application with the Hypervisor, which returns the respective image part of the Virtual Screen as a bitmap to the Destination application. The Destination application may now display the image part in another/second window.

In this manner, the various graphical objects of the source application displayed by the Destination application may be handled separately. Hence, parts of the prior tool i.e. the source application may be selectively displayed in the Destination application and allow separate user interaction.

DETAILED DESCRIPTION

Figure 1:
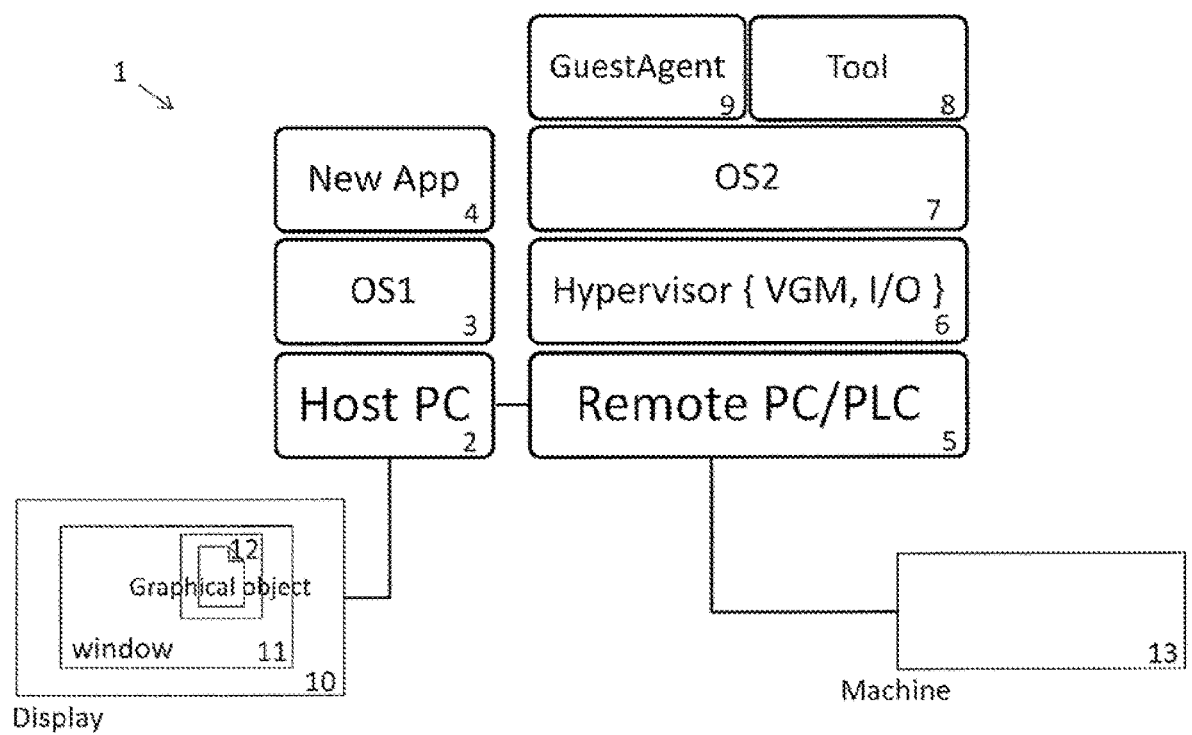
FIG. 1 illustrates schematically an example system in accordance with an implementation.

Referring to FIG. 1, a system 1 for providing control of a graphical user interface of an application executed on a virtual machine is shown. The system 1 consists of a host computer 2 running a main Operating System 3 that executes a destination application 4. A remote computer 5 further executes a hypervisor 6 running a virtual machine which enables the use of an Operating System 7 different from that running on the host 2. On the virtual machine a source application 8 and a guest agent application 9 are executed. The host computer 2 is connected to a display 10 that displays a graphical user interface 11 of the destination application 4. The guest agent application 9 provides interaction in the destination application 4 with a graphical object 12 of the source application 8, whereas the hypervisor 6 provides image content of the graphical object 12 of the source application 8 to the destination application 4. The destination application 4 displays the image content of the graphical object 12 provided by the hypervisor in a window 11.

In the system of FIG. 1 the source application 8 may be a tool application used for controlling an automated machine 13. This tool application 8 may be referred to as a source application from which the content needs to be embedded in the destination application 4, which consequently may be referred to as a destination application.

Figure 2:
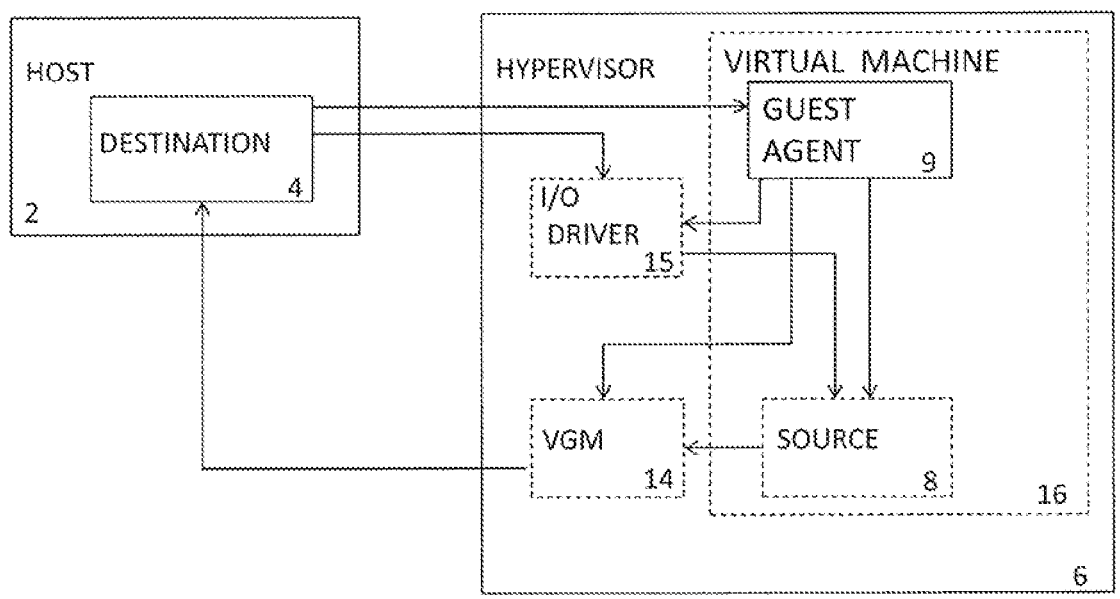
FIG. 2 is a block diagram of an example system in accordance with an implementation.

FIG. 2 shows a block diagram illustrating the configuration of the system of FIG. 1 in more detail. FIG. 2 further illustrates that the hypervisor 6 has a Virtual Graphic Memory 14 and an input-Output driver 15. The Virtual Graphic Memory (VGM) 14 is allocated to a graphical subsystem of the source application 8 for rendering a full image of the source application 8. Furthermore, while user input is processed by the hypervisor, the Input-Output driver 15 is configured by the guest agent application 9 for handling end user input forwarded by the destination application 4 to provide interaction with the graphical object 12 of the source application 8.

As seen in FIG. 2 the destination application 4 is executed on the host 2; in this example within a Windows Operating System. A virtual machine 16 is running on the hypervisor 6 providing an Operating System (OS) environment different from the one of the host 2. In this OS environment the source application 8 and the guest agent application 9 are executed on the virtual machine 16. Through the use of the guest agent application 9 interaction in the destination application with the graphical object 12 of the source application 8 is provided. And through the hypervisor 6 image content of the graphical object 12 of the source application 8 is provided. The image content provided by the hypervisor 6 is displayed in a window of the destination application 4.

Figure 3:
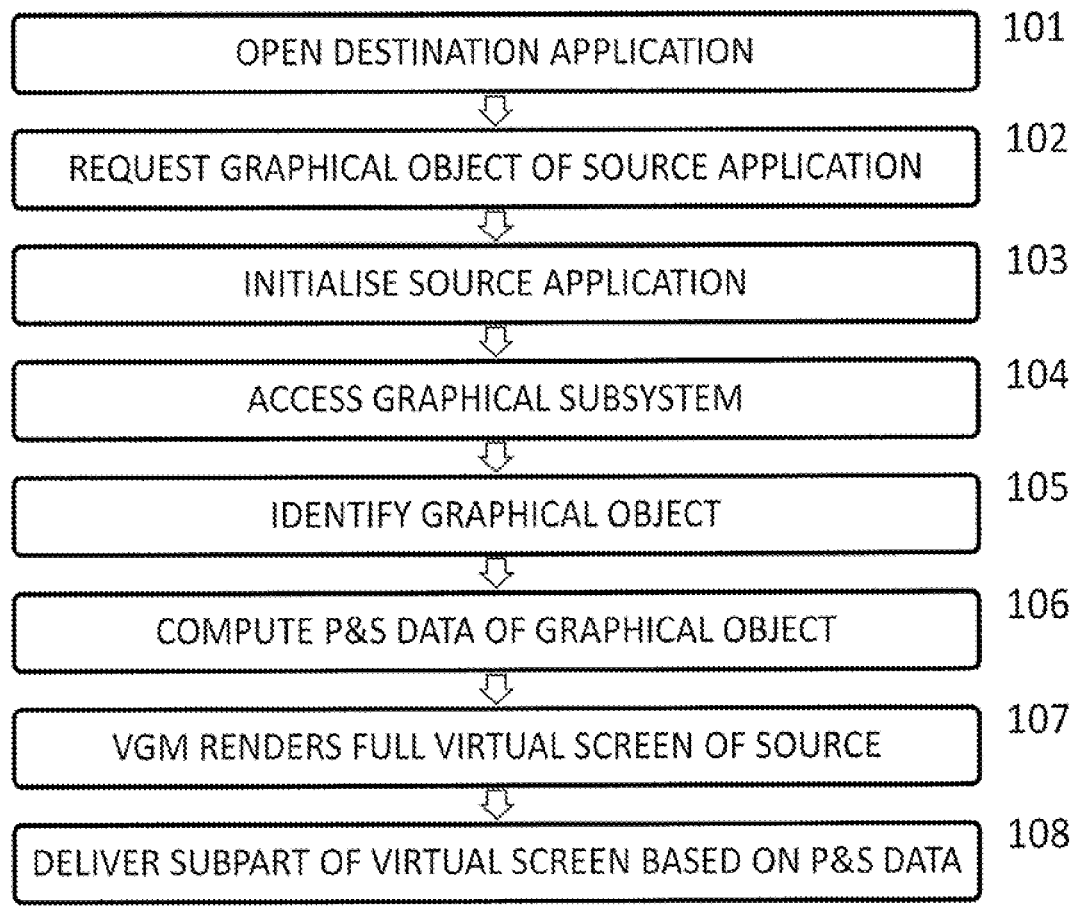
FIG. 3 shows a flowchart of an example process for delivering image content in accordance with an implementation.

Referring to FIG. 3, a flowchart of an example of a process for delivering image content is shown. When the destination application is opened 101 (i.e. executed), the destination application will request 102 the graphical object of the source application from the guest agent application in order to display the image content and provide interaction with the graphical object. The guest agent application initializes 103 the source application. If the source application comes with an Application Programming Interface (API), the guest agent may use the API to start the source application and configure it according to predetermined, settings of the destination application. If no API is available, the guest agent application may send simulated input, such as e.g. keyboard and/or mouse or other peripheral input, to the I/O driver, in order to start and configure the source application. For example, provide a combination PageDown and arrow keystrokes to navigate in a file or document of the type associated with the source application.

The guest agent application accesses 104 the graphical subsystem of the source application and identifies 105 the graphical object in this graphical subsystem. For a Win32 application the graphical subsystem corresponds to the window/component hierarchy and the guest application will go through the list to retrieve the properties of the graphical object. For a WPF application, the graphical subsystem corresponds to a Visual tree; whereas for a Java application the graphical subsystem could e.g. correspond to a component hierarchy, depending on the toolkit used.

Once the guest agent has identified the graphical object in the graphical subsystem, the guest agent application computes 106 position & size data for the identified graphical object. The VGM 14 of the hypervisor 6 renders 107 the full screen image for the source application. The computed 106 position & size data is then used to select a subpart of the full screen associated with the requested graphical object. The guest agent application delivers 109 this selected subpart of the full screen image as the image content to the destination application. The destination application displays the subpart of the Virtual screen in a separate, distinct window. In another example of a process for delivering image content, it may be the destination application that grabs the image content from the VGM based on the computed 106 position & size data; thereto the guest agent delivers the position & size data to the destination application.

The process for delivering image content as described above may be performed for multiple graphical objects simultaneously, and as a result subparts of the full Virtual screen will be delivered separately as respective image contents. As graphical objects of the source application can be displayed independently, end user interaction with different graphical objects may also be processed separately.

Referring to FIG. 2 wherein the I/O driver 15 is configured by the guest agent application 9, the end user input for different graphical objects can be processed separately as it can be associated with the respective graphical objects as identified in the graphical subsystem of the source application 8. Such end user input may include opening, moving and/or closing of certain graphical objects. Accordingly, the interaction provided in the destination application 4 with a graphical object of the source application 8 through the guest agent application 9 further includes the guest agent application 9 managing the identified graphical object associated therewith. This managing by the guest agent application 9 of the identified graphical object thus includes opening, tracking and closing of the graphical object.

In order to monitor and handle and user interaction, the guest agent installs hooks in the Operating System of the virtual machine. Implementation of such hooking procedures is generally possible within various Operating Systems such as e.g. Windows and allows intercepting of events, such as messages in dialog boxes, mouse actions, and keystrokes. The interception then allows to modify the manner in which the interaction is graphically displayed.

Figure 4:
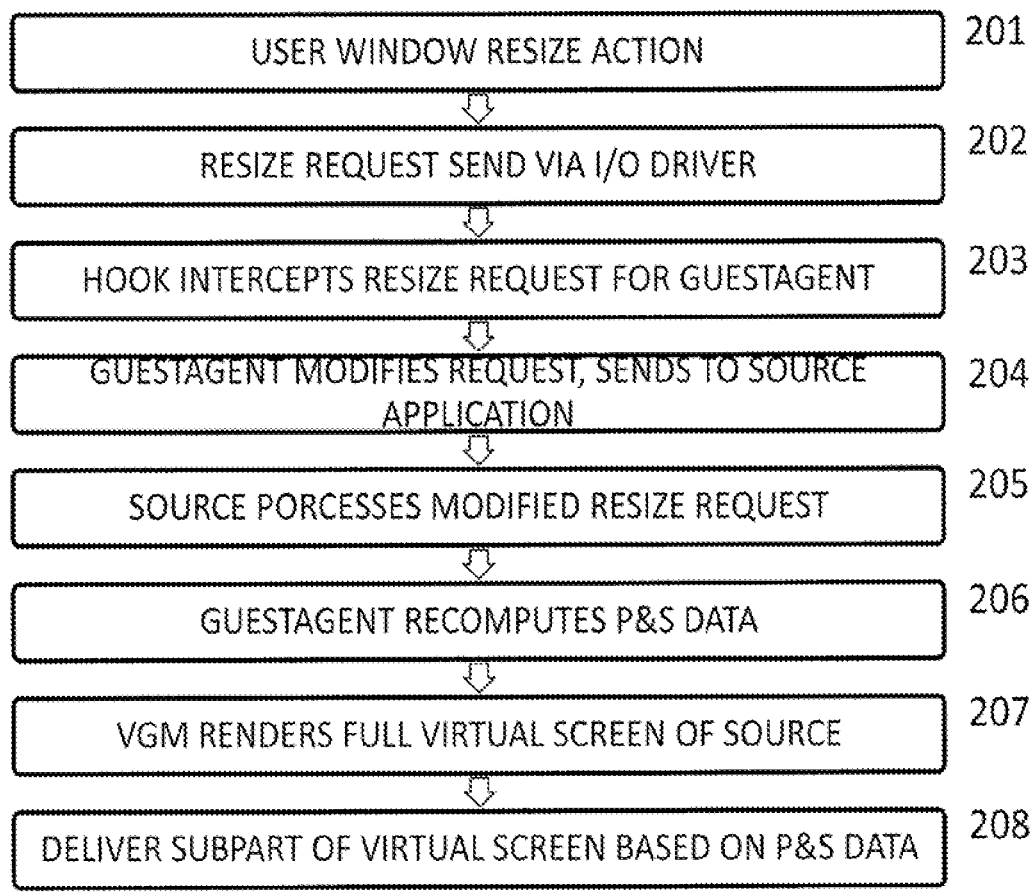
FIG. 4 shows a flowchart of an example for processing a resize request.

Referring to FIG. 4, a flowchart of an example for processing a resize request is shown. A user may resize a subwindow 201 of the destination application displaying a graphical object of the source application, which corresponds to a subpart of the Virtual screen, such a resize action is handled as a resize request and send 202 towards the source application via the I/O driver of the Hypervisor, where it is intercepted by a hook 203 installed by the guest agent. The guest agent modifies the request to comply with the requested resize and sends the modified request 204 to the guest agent. For example, a user resizing a subwindow in the destination application to extend by 30 pixels requires the guest agent to extend the entire window of the source application by 30 pixels and consecutively extend the graphical object within the source application by 30 pixels. If the entire source application window was not resized by extending, resizing by extending of the graphical object would cause a resize by shrink of other graphical parts in the source application.

Accordingly, the modified resize request is processed 205 by the Source application, which triggers the guest agent to re-compute 206 the Position & Size data of the graphical object. The resized full Virtual screen is rendered 207 in the Virtual Graphic Memory, and the resized subpart of the Virtual screen is delivered 208 to the destination application based on the re-computed Position & Size data.

When for example a tree view and an editor screen which are adjacent in a source application are displayed at different spaced-apart positions in the destination application, the above described manner of processing the resize request allows to resize one of these graphical objects, e.g. the tree view, individually without impacting the position and size of the other graphical object, e.g. the editor screen.

Figure 5:
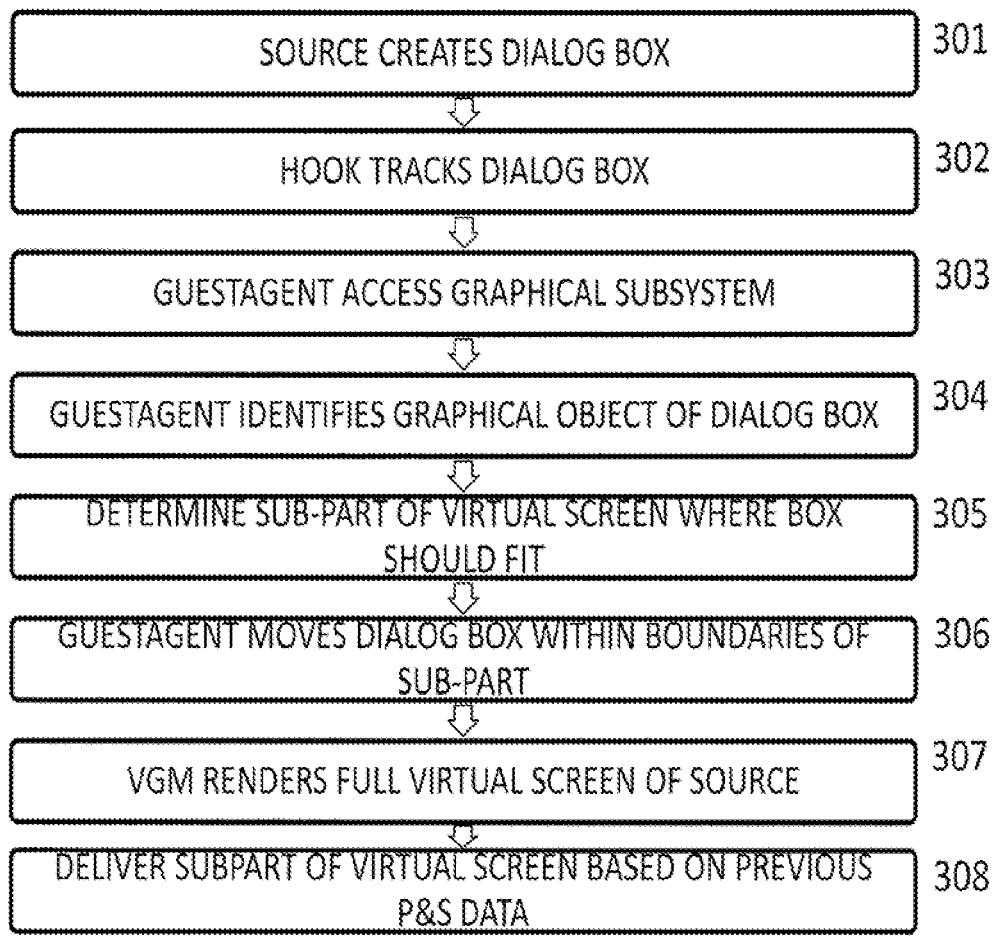
FIG. 5 shows a flowchart of an example for processing a dialog box.

Referring to FIG. 5, a flowchart of an example for processing dialog box is shown. In software applications pop-up messages and dialog boxes are used in a variety of ways to provide additional user interaction, such as alerting the user of certain events, providing additional options of choice, drawing the attention to specific warnings, and/or showing the status of a progress bar. Such messages and dialog boxes are generated by the source application and need to be displayed in the destination application on top of, or at least near, the graphical object to which they relate. For example, a dialog box showing options for editing needs to be displayed on top of the editor screen and not on top of the tree view.

Thereto, hooks are installed by the guest agent in the Operating System of the Virtual Machine to enable hooking procedures. Accordingly when a source application running on a virtual machine creates 301 a dialog box a hook tracks 302 the dialog box. Triggered by the hook the guest agent accesses 303 the graphical subsystem and identifies 304 the graphical object of the dialog box based on the hook.

The guest agent determines 305 to which previously rendered sub-part of the Virtual Screen it relates i.e. the related graphical object and consequently where it needs to be displayed; such information may be readily retrieved from the graphical subsystem. The previously rendered sub-part corresponds to a previously identified graphical object, such as for example a tree view or an editor screen, of which position & size data were previously computed and stored by guest agent. The previously computed position & size data allows the guest agent to moves 306 the dialog box graphical object within boundaries of the previously identified graphical object e.g. the tree view or the editor screen.

To ensure that the dialog box graphical object fits within the boundaries of the related graphical object, the dialog box graphical object may be resized by the guest agent. In another example, the guest agent may enforce that display and resizing of the related graphical object is kept above a threshold minimum to ensure that the dialog box will fit within the boundaries of the related graphical object. As for each graphical object it may be assessed in advance which dialog boxes may be associated therewith, the minimum size data of the related graphical object and therewith the boundaries of the sub-part of the Virtual Screen can be set in order to accommodate the size of the dialog box.

Once the dialog box graphical object is moved within the boundaries of the sub-part of the Virtual Screen, the Virtual Graphic Memory renders 307 the full Virtual Screen of the source application. The relevant subpart of the newly rendered Virtual Screen data is delivered 308 to the destination application based on previously computed Position & Size of the previously identified graphical object.

Figure 6:
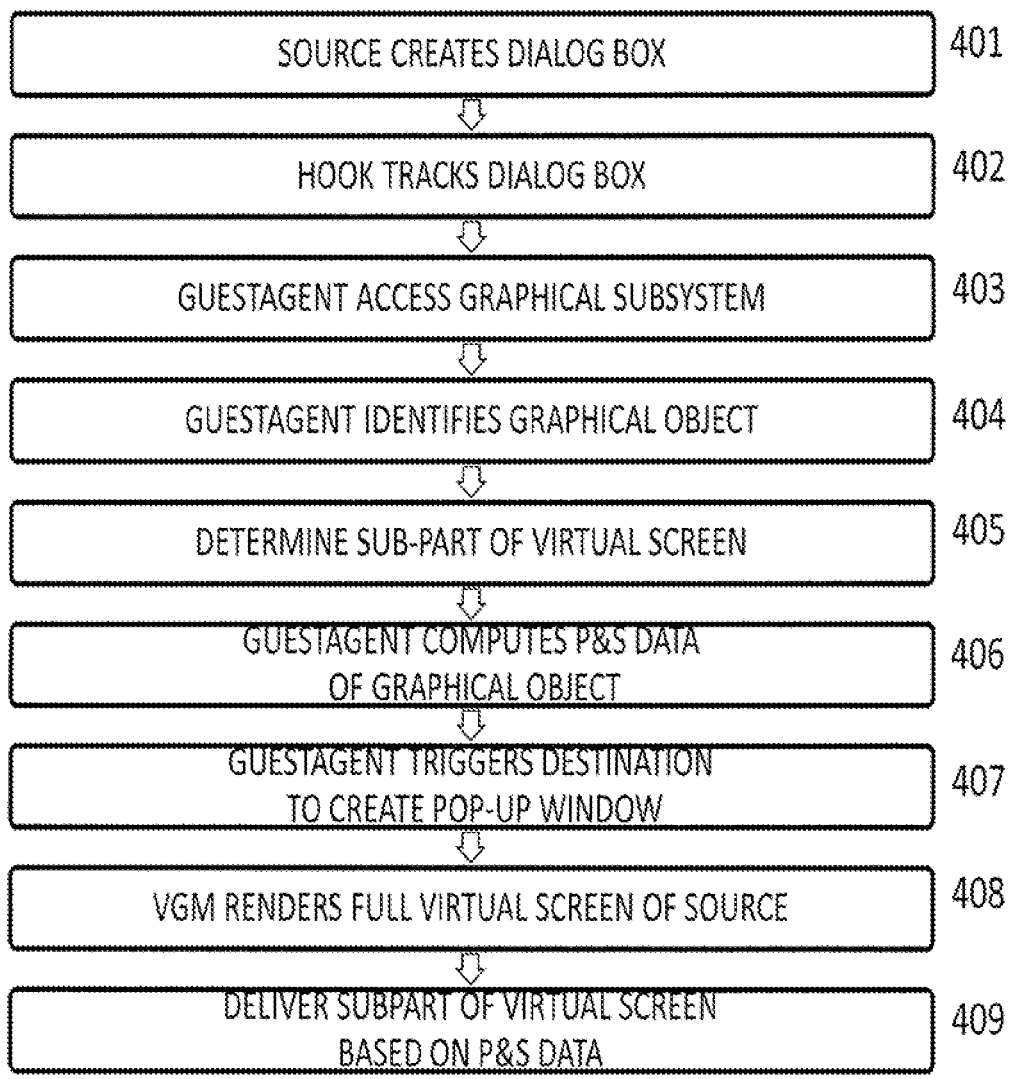
FIG. 6 shows a flowchart of another example for processing a dialog box.

Referring to FIG. 6, a flowchart of another example for processing a dialog box is shown. The processing starts out with similar steps as those explained in relation to FIG. 5. Thus, when a source application running on a virtual machine creates 401 a dialog box a hook tracks 402 the dialog box. Triggered by the hook the guest agent accesses 403 the graphical subsystem and identifies 404 the graphical object of the dialog box based on the hook. The guest agent determines 405 to which previously rendered sub-part of the Virtual Screen it relates and where it needs to be displayed as explained above.

The guest agent computes position & size data 406 of the dialog box graphical object. The guest agent triggers 407 the destination application, e.g. via the I/O driver, to create a pop-up window for the previously rendered graphical object to which the dialog box relates. The computed size data may be taken into account.

Next, the Virtual Graphic Memory renders 408 the full Virtual Screen of the source application. The relevant sub-part of the newly rendered Virtual Screen is delivered 409 to the destination application based on the computed Position & Size data of the dialog box graphical object.

The examples of processing as described above allows to display any dialog box or pop-up message on top of the graphical object to which it relates. For example, in a tree view of a folder structure a dialog box may be opened for showing various options relating to that tree view. If in the source application the dialog box would partially be covering both the tree view and an adjacent editor screen, it would without the guest agent interception be displayed as cut in two in the destination application as the tree view and editor screen are spaced-apart therein.

The operation of the guest agent application as described above enables an end user to handle graphical objects of the source application as separate, independent objects within the destination application. As in contrast to prior art solutions, wherein the full screen rendered by the VGM would be delivered as single, indivisible, indistinguishable image content, which excludes such interaction.

Figure 7:
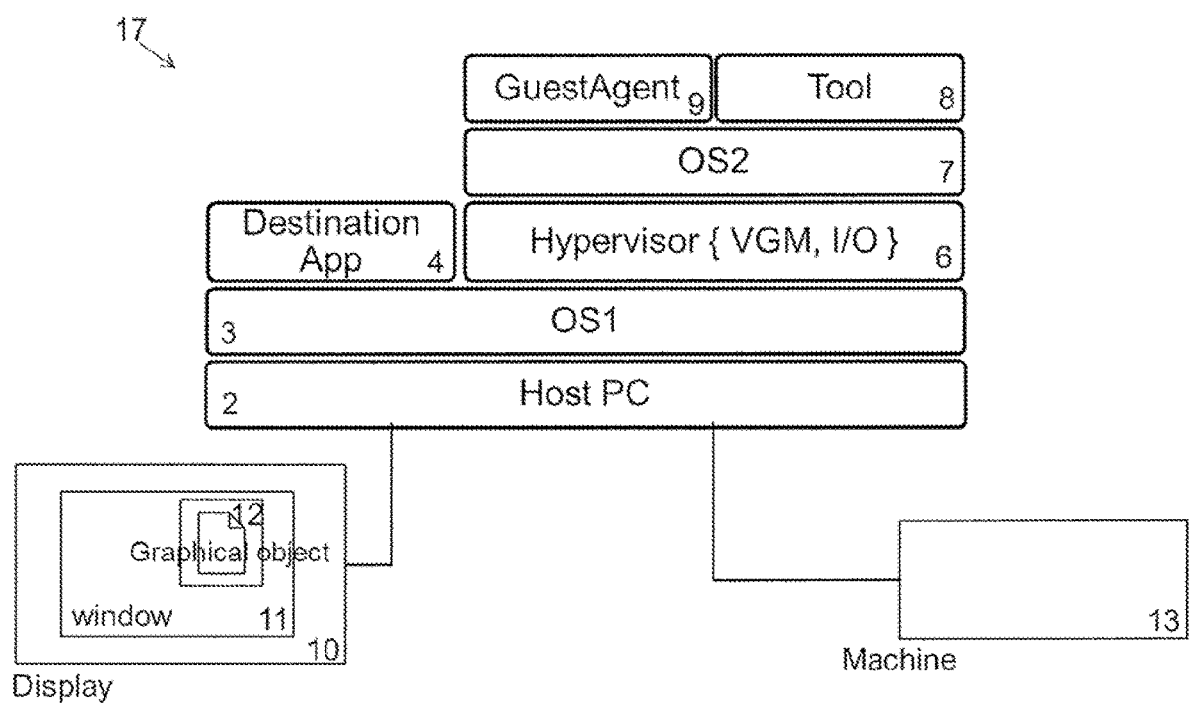
FIG. 7 illustrates schematically another example system in accordance with an implementation.

Referring to FIG. 7, another embodiment of a system for providing control of a graphical user interface of an application executed on a virtual machine is shown. In this example, the system 17 consists of host computer 2 running the main Operating System 3. The main Operating System 3 now executes both the destination application 4 and the hypervisor 6. While the hypervisor 6 still runs the virtual machine that enables the use of the Operating System 7 different from that running directly on the host 2. On the virtual machine the source application 8 and the guest agent application 9 are executed. The host computer 2 is connected to automated machine 13 and to display 10 that displays a graphical user interface 11 of the destination application 4. The guest agent application 9 provides interaction in the destination application 4 with the graphical object 12 of the source application 8, whereas the hypervisor 6 provides image content of the graphical object 12 of the source application 8 to the destination application 4. The destination application 4 displays the image content of the graphical object 12 provided by the hypervisor in a window 11.

Figure 8:
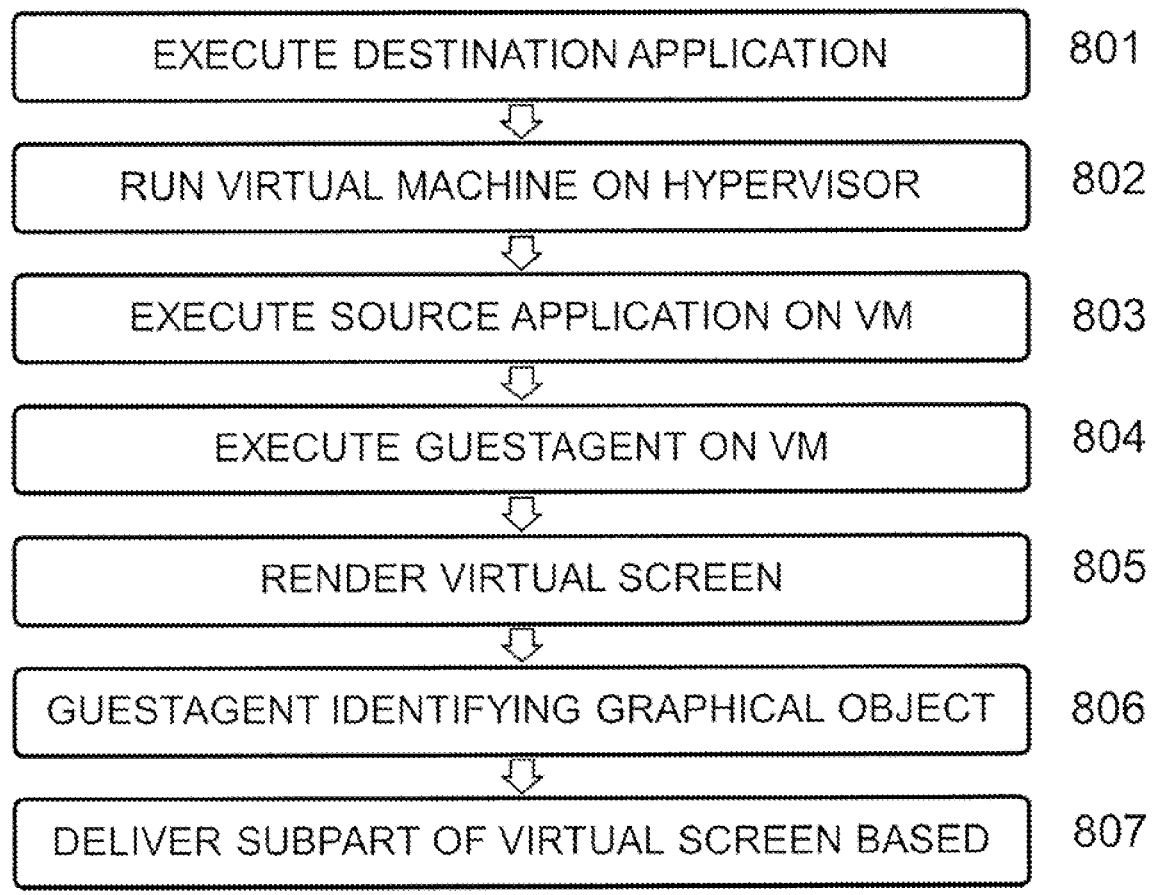
FIG. 8 shows a flowchart of an example of a method according to the invention.

Turning to FIG. 8, an example of method for providing control of a graphical user interface of an application executed on a virtual machine is illustrated. This method may be implemented by each of the system configurations shown in FIGS. 1 and 7. The method includes executing (801) the destination application (4) on the host (2) and running (802) a virtual machine on a hypervisor (6). Depending on the system configuration, the hypervisor may be run on the same host (2) or on the remote host (5). The method further includes executing (803) the source application (8) on the virtual machine (7) and executing (804) the guest agent application (9) on the virtual machine (7). The hypervisor (6) renders (107, 805) the full virtual screen of the source application (8). And the guest agent application (9) identifies (105, 806) at least one graphical object (12) of the source application (8) and determines (806) the subpart of the rendered full virtual screen that represents the at least one graphical object (12). The subpart of the full virtual screen is then delivered (807) to the destination application (4) as separate image data.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. For example, the host computer might also run a hypervisor as main kernel, the hypervisor in turn executing two virtual machines each running a different OS: the main OS of the destination application and the legacy OS of the legacy tool application. In addition, it is specifically contemplated that a particular feature described, either individually or as part of an embodiment, can be combined with other individually described features, or parts of other embodiments.

The invention claimed is:

1. A computer-implemented method for providing control of a graphical user interface of an application executed on a virtual machine, the method comprising:
executing a destination application;
running the virtual machine on a hypervisor;
executing a source application on the virtual machine;
executing a guest agent application on the virtual machine;
rendering, by the hypervisor, a full virtual screen of the source application;
identifying, by the guest agent application, at least one graphical object of the source application as content to be embedded in the destination application and determining a subpart of the rendered full virtual screen that represents the at least one graphical object; and
delivering the subpart of the full virtual screen that represents the at least one graphical object of the source application as the content to the destination application to be embedded as separate image data from that of the full virtual screen, the delivering of the subpart of the full virtual screen to the destination application to be embedded as separate image data including delivering, by the guest agent application, position and size data to the destination application and the destination application grabbing the separate image data from the full virtual screen of the source application.

2. The method according to claim 1, further comprising:
processing, by the hypervisor, user input for the source application; and
modifying, by the guest agent application, the user input for adaptation to the rendered full virtual screen.

3. The method according to claim 1, further comprising:
hosting the destination application and the virtual machine on a single host computer; or
hosting the destination application and the virtual machine on distinct host computers.

4. The method according to claim 1, further comprising:
displaying the separate image data in a window of the destination application.

5. The method according to claim 1, wherein the identifying, by the guest agent application, of the at least one graphical object of the source application as the content to be embedded in the destination application and determining of the subpart of the rendered full virtual screen that represents the at least one graphical object comprises:
accessing, by the guest agent application, a graphical subsystem of the source application;
identifying, by the guest agent application, a graphical object in the graphical subsystem of the source application; and
computing, by the guest agent application, position and size data for the identified graphical object.

6. The method according to claim 1, further comprising:
providing, by the hypervisor, a Virtual Graphic Memory; and
allocating the Virtual Graphic Memory to a graphical subsystem of the source application for rendering a full virtual screen of the source application.

7. The method according to claim 1, further comprising:
providing, by the hypervisor, an Input-Output driver; and
configuring, by the guest agent application, the Input-Output driver for modifying the user input for adaptation to the rendered full virtual screen.

8. The method according to claim 1, further comprising:
generating, by the source application, a dialog box including a notification to be displayed at the destination application;
determining, by the guest agent application, that the dialog box generated by the source application is to be displayed at the at least one graphical object; and
automatically resizing, by the guest agent application, the subpart of the full virtual screen that represents the at least one graphical object such that the dialog box fits within boundaries of the subpart of the full virtual screen that represents the at least one graphical object.

9. A system for providing control of a graphical user interface of an application executed on a virtual machine, the system comprising:
a first host computer configured to execute a destination application;
a second host computer configured to execute a hypervisor running the virtual machine, the virtual machine executing a source application and a guest agent application;
wherein the hypervisor is configured to render a full virtual screen of the source application;
wherein the guest agent application is configured to identify at least one graphical object of the source application as content to be embedded in the destination application and determine a subpart of the rendered full virtual screen that represents the at least one graphical object;

wherein the hypervisor is configured to deliver the subpart of the full virtual screen that represents the at least one graphical object of the source application as the content to the destination application to be embedded as separate image data from that of the full virtual screen, delivering the subpart of the full virtual screen to the destination application to be embedded as separate image data including delivering position and size data to the destination application and the destination application grabbing the separate image data from the full virtual screen of the source application; and wherein the destination application is configured to display the separate image data in a window.

10. The system according to claim 9, wherein the hypervisor comprises a Virtual Graphic Memory which is allocated to a graphical subsystem of the source application to render a full image of the source application.

11. The system according to claim 9, wherein the hypervisor further comprises an Input-Output driver; and wherein the guest agent application configures the Input-Output driver to handle end user input forwarded by the destination application to provide interaction with a graphical object of the source application.

12. A system for providing control of a graphical user interface of an application executed on a virtual machine, the system comprising:

a host computer configured to execute a destination application and execute a hypervisor running the virtual machine, the virtual machine executing a source application and a guest agent application;

wherein the hypervisor is configured to render a full virtual screen of the source application;

wherein the guest agent application is configured to identify at least one graphical object of the source application as content to be embedded in the destination application and determine a subpart of the rendered full virtual screen that represents the at least one graphical object;

wherein the hypervisor is configured to deliver the subpart of the full virtual screen that represents the at least one graphical object of the source application as the content to the destination application to be embedded as separate image data from that of the full virtual screen, delivering the subpart of the full virtual screen to the destination application to be embedded as separate image data including delivering position and size data to the destination application and the destination application grabbing the separate image data from the full virtual screen of the source application; and wherein the destination application is configured to display the separate image data in a window.

* * * * *